(12) United States Patent
Motoki et al.

(10) Patent No.: US 7,765,661 B2
(45) Date of Patent: Aug. 3, 2010

(54) METHOD FOR MANUFACTURING CERAMIC ELECTRONIC COMPONENT AND PLANTING BATH

(75) Inventors: Akihiro Motoki, Fukui (JP); Makoto Ogawa, Fukui (JP); Seiichi Matsumoto, Fukui (JP); Yoshihiko Takano, Otsu (JP); Tatsuo Kunishi, Moriyama (JP)

(73) Assignee: Murata Manufacturing Co., Ltd., Nagaokakyo-shi, Kyoto-fu (JP)

( * ) Notice: Subject to any disclaimer, the term of this patent is extended or adjusted under 35 U.S.C. 154(b) by 184 days.

(21) Appl. No.: 11/909,736

(22) PCT Filed: Feb. 1, 2006

(86) PCT No.: PCT/JP2006/301653

§ 371 (c)(1), (2), (4) Date: Sep. 26, 2007

(87) PCT Pub. No.: WO2007/088600

PCT Pub. Date: Aug. 9, 2007

(65) Prior Publication Data

US 2009/0049679 A1     Feb. 26, 2009

(51) Int. Cl.
*H01G 7/00* (2006.01)
*C25D 5/00* (2006.01)
*H01G 4/008* (2006.01)

(52) U.S. Cl. .............. 29/25.41; 29/25.42; 205/80; 205/81; 205/159; 205/162; 361/305

(58) Field of Classification Search ........... 29/25.41, 29/25.42; 205/80, 91, 159, 162; 361/305
See application file for complete search history.

(56) References Cited

U.S. PATENT DOCUMENTS 2,461,507 A * 2/1949 Gray et al. ............... 205/302

(Continued)

FOREIGN PATENT DOCUMENTS

JP    50-101236 A    8/1975

(Continued)

OTHER PUBLICATIONS

Some specific features of the electrodeposition of a tin-zinc alloy from pyrophosphate electrolytes Vagramyan et al, Electokhimiya, 21 (11), 1558-60 (Russian (1985).*

(Continued)

*Primary Examiner*—C. J Arbes
(74) *Attorney, Agent, or Firm*—Dickstein, Shapiro, LLP.

(57) ABSTRACT

A method for manufacturing a ceramic electronic component having excellent solderability is provided. In this method, the elution of barium from the ceramic electronic component and the adhesion of ceramic electronic components in tin plating are reduced. The method for manufacturing a ceramic electronic component includes the steps of providing an electronic component of barium-containing ceramic and forming an electrode on the outer surface of the electronic component, the electrode being electroplated with tin. In this method, a plating bath used in the tin plating has a tin ion concentration A in the range of 0.03 to 0.51 mol/L, a sulfate ion concentration B in the range of 0.005 to 0.31 mol/L, a molar ratio B/A of less than one, and a pH in the range of 6.1 to 10.5.

15 Claims, 1 Drawing Sheet

U.S. PATENT DOCUMENTS

| | | | |
|---|---|---|---|
| 3,755,096 A * | 8/1973 | Passal | 205/304 |
| 6,373,683 B1 * | 4/2002 | Higuchi et al. | 361/305 |
| 6,500,327 B1 * | 12/2002 | Saitoh et al. | 205/252 |
| 6,911,138 B2 * | 6/2005 | Motoki et al. | 205/253 |
| 2003/0052014 A1 * | 3/2003 | Motoki et al. | 205/302 |
| 2004/0066605 A1 * | 4/2004 | Trinh | 361/321.2 |
| 2009/0049679 A1 * | 2/2009 | Motoki et al. | 29/602.1 |

FOREIGN PATENT DOCUMENTS

| | | | | |
|---|---|---|---|---|
| JP | 2003-027277 A | | 1/2003 | |
| JP | 2003-147573 A | | 5/2003 | |
| JP | 2003129272 A | * | 5/2003 | |
| JP | 2003342778 A | * | 12/2003 | |
| JP | 2004-083942 A | | 3/2004 | |
| JP | 2004-107693 A | | 4/2004 | |
| JP | 2005-517814 A | | 6/2005 | |
| WO | WO-03/071001 A1 | | 8/2003 | |

OTHER PUBLICATIONS

Bright tin-zinc electroplating from a cirate bsth, Cai, Genchun (ShanghaiElectroplat. Fact. Shanghai, Peop. Rep. China) Duandu Yu Huanbao 11(3) 36-37 (Chinese) 1991.*

Kinetic simultaneous electroreduction of copper (II) and tin (III) from citrate electrolyte Yapontseva, et al, NAN Ukr , Kiec Ukraine, Ukrainskii Khimicheskii Zhurnal (Russian Edition) 69 (3-4), 80-83 (Rusian) 2003.*

Written Opinion of the International Searching Authority for International Application No. PCT/JP2006/301653, dated Apr. 7, 2006.

* cited by examiner

METHOD FOR MANUFACTURING CERAMIC ELECTRONIC COMPONENT AND PLANTING BATH

TECHNICAL FIELD

The present invention relates to a method for manufacturing a ceramic electronic component such as a ceramic capacitor and to a plating bath. More particularly, the present invention relates to a method for manufacturing a ceramic electronic component including an improved step of plating an electrode with tin and a plating bath for use in the method.

BACKGROUND ART

In ceramic electronic components such as multilayer ceramic capacitors, external electrodes are often plated with tin to improve their solderability. The external electrodes are generally electroplated in a sulfuric acid bath, a sulfamic acid bath, an alkanesulfonate bath, an alkanolsulfonate bath, a fluoroboric acid bath or a phenolsulfonic acid bath.

However, the sulfamic acid bath or the alkanesulfonate bath may cause elution of barium in the bath for barium-containing ceramics such as barium titanate ceramics. The elution of barium results in erosion of the ceramics, thereby often reducing the insulation resistance of the ceramics.

In the sulfuric acid bath, tin ions coexist with sulfate ions. Thus, the sulfuric acid bath causes little elution of barium even for the barium-containing ceramics, and therefore hardly reduces the insulation resistance of the ceramics. However, ceramic components may adhere to each other during plating.

To prevent this adhesion, Patent Document 1 proposes a method of tin plating in a bath that contains tin ions, sulfate ions and ions of at least one acid selected from the group consisting of sulfamic acid, alkanesulfonic acids, alkanolsulfonic acids, fluoroboric acid and phenolsulfonic acid at a tin ion concentration of 0.008-0.84 mol/L and a sulfate ion concentration of 0.02-0.31 mol/L at a pH of 4.1-6.0.

Patent Document 1 states that use of the tin plating bath containing these particular components can reduce the elution of barium from the barium-containing ceramics and prevent electronic components from adhering to each other by plating.

Patent Document 1: Japanese Unexamined Patent Application Publication No. 2004-107693

DISCLOSURE OF INVENTION

Problems to be Solved by the Invention

However, ceramic electronic components manufactured using the tin plating bath disclosed in Patent Document 1 sometimes resulted in poor solderability of tin-plated electrodes. In other words, the tin-plated electrodes were sometimes difficult to cover with solder.

Accordingly, it is an object of the present invention to overcome the problems described above and provide a method for manufacturing a ceramic electronic component having excellent solderability. In this method, the elution of barium and the adhesion of ceramic electronic components in tin plating are reduced. It is another object of the present invention to provide a plating bath for use in the method.

Means for Solving the Problems

According to a first broad aspect, the present invention provides a method for manufacturing a ceramic electronic component including the steps of providing a barium-containing ceramic electronic component and forming an electrode on the outer surface of the electronic component, the electrode being electroplated with tin. In this method, a plating bath used in the tin plating has a tin ion concentration A in the range of 0.03 to 0.51 mol/L, a sulfate ion concentration B in the range of 0.005 to 0.31 mol/L, the molar ratio B/A being less than one, and a pH in the range of 6.1 to 10.5.

According to a second broad aspect, the present invention provides a plating bath having a tin ion concentration A in the range of 0.03 to 0.51 mol/L, a sulfate ion concentration B in the range of 0.005 to 0.31 mol/L, the molar ratio B/A being less than one, and a pH in the range of 6.1 to 10.5.

Advantages of the Invention

A plating bath according to the present invention has a tin ion concentration A in the range of 0.03 to 0.51 mol/L, a sulfate ion concentration B in the range of 0.005 to 0.31 mol/L, a molar ratio B/A of less than one, and a pH in the range of 6.1 to 10.5. Thus, during tin plating of the outer surface of an electronic component, for example, a ceramic electronic component, the elution of metal from the outer surface and the adhesion of ceramic electronic components are reduced. In addition, within the pH range specified above, a tin film formed on an electrode has improved solderability and smaller variations in thickness.

According to a method for manufacturing a ceramic electronic component according to the present invention, a plating bath used in tin plating has a tin ion concentration A in the range of 0.03 to 0.51 mol/L, a sulfate ion concentration B in the range of 0.005 to 0.31 mol/L, a molar ratio B/A of less than one, and a pH in the range of 6.1 to 10.5. Under these conditions, tin plating of the outer surface of a barium-containing ceramic electronic component reduces the elution of barium in the plating bath and prevents electronic components from adhering to each other. Furthermore, a tin film formed on an electrode has improved solderability and smaller variations in thickness within the pH range specified above. Hence, a ceramic electronic component having excellent solderability can consistently be manufactured.

REFERENCE NUMERALS

Figure 1:
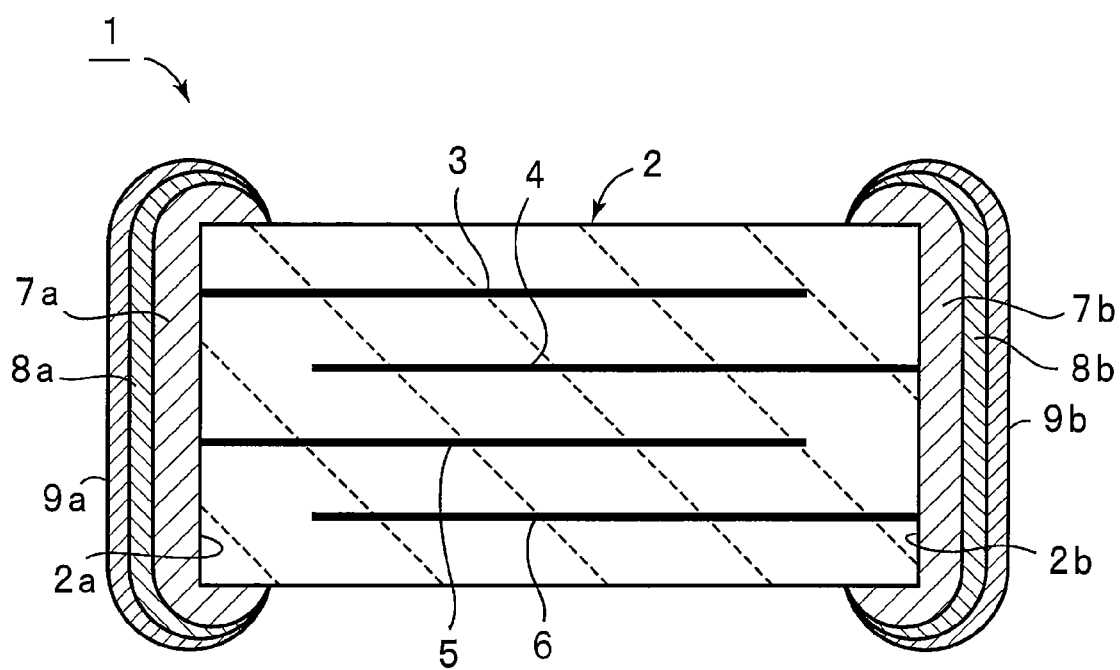
FIG. 1 is a front cross-sectional view of a multilayer ceramic capacitor serving as a ceramic electronic component according to an embodiment of the present invention.

1 multilayer ceramic capacitor
2 ceramic sintered body (electronic component to be plated)
3 to 6 internal electrode
7a, 7b electrode layer constituting substrate electrode
8a, 8b nickel plating film constituting substrate electrode
9a, 9b tin plating film

BEST MODE FOR CARRYING OUT THE INVENTION

The present invention will be described in detail below with specific embodiments and examples.

In a method for manufacturing a ceramic electronic component according to the present invention, a barium-containing ceramic electronic component is firstly provided.

Examples of barium-containing ceramics include, but are not limited to, barium titanate dielectric ceramics and Ba—Al—Si glass ceramics.

Furthermore, the electronic component may be formed only of barium-containing ceramic or may be a multilayered ceramic sintered body including a plurality of internal electrodes disposed in a barium-containing ceramic.

According to the present invention, a tin-plated electrode is formed on the outer surface of the electronic component after the electronic component is provided. The tin-plated electrode may have any structure. For example, the tin-plated electrode may be formed only of a tin plating film.

Preferably, the tin-plated electrode includes a substrate electrode plated with nickel and tin. The substrate electrode may be formed by any method; for example, by baking an electroconductive paste or by a thin film-forming method such as vapor deposition or sputtering.

The substrate electrode can be electroplated with tin without problems.

Tin plating is performed in a plating bath having a tin ion concentration A in the range of 0.03 to 0.51 mol/L, a sulfate ion concentration B in the range of 0.005 to 0.31 mol/L, a molar ratio B/A of less than one, and a pH in the range of 6.1 to 10.5.

Preferably, the plating bath may contain ions of at least one acid selected from the group consisting of sulfamic acid, alkanesulfonic acids, alkanolsulfonic acids, fluoroboric acid and phenolsulfonic acid. These ions further efficiently prevent electronic components from adhering to each other by plating.

The specified concentration of sulfate ions in a plating bath according to the present invention reduces the elution of barium from a barium-containing ceramic, as is clear from specific examples described below. Furthermore, the specified concentration of tin ions prevent electronic components from adhering to each other by plating.

Furthermore, a molar ratio of sulfate ions B to tin ions A of less than one can further prevent electronic components from adhering to each other by plating. A molar ratio B/A of more than one may result in adhesion of electronic components.

The specified pH of plating bath in the range of 6.1 to 10.5 improves the solderability of a tin-plated electrode and reduces variations in the thickness of tin plating, as is clear from the examples described below. A pH of less than 6.1 results in poor solderability of a tin-plated electrode and large variations in the thickness of tin plating. A pH of more than 10.5 results in the precipitation of tin ions in the plating bath. Preferably, the pH is in the range of 6.1 to 7.5, which further improves the solderability of a tin-plated electrode.

A plating bath according to the present invention may further contain a complexing agent and/or a surfactant, if necessary. Preferably, the molar ratio of a complexing agent to tin ions is at least 1.5. A complexing agent can prevent a tin plating bath from white turbidity. Thus, a tin film having a sufficient thickness can be formed. A surfactant can provide a tin film having consistent surface properties and increase the solderability of the tin film.

Specific examples of the present invention will be described below.

As illustrated in FIG. 1, a multilayer ceramic capacitor 1 was manufactured. A ceramic sintered body 2 was prepared as an electronic component before plating. The ceramic sintered body 2 was formed of barium titanate ceramic. In the ceramic sintered body 2, a plurality of nickel internal electrodes 3 to 6 were disposed with ceramic layers interposed therebetween. The ceramic sintered body 2 had a size of 3.2×1.6×1.6 mm. The number of internal electrodes were 320. The capacitor 1 had a design capacitance of 10 μF.

Copper paste was applied to the end faces 2a and 2b of the ceramic sintered body 2 and was baked to form electrode layers 7a and 7b. Nickel films 8a and 8b each having a thickness of 2.0 μm were formed on the electrode layers 7a and 7b by barrel electroplating at an electric current density at cathode of 0.2 A/dm$^2$.

Tin films 9a and 9b were formed on substrate electrodes, which are composed of the electrode layers 7a and 7b and the nickel films 8a and 8b, in a plating bath X or Y.

(Composition of Tin Plating Bath X)
   Tin(II) sulfamate: Xa mol/L
   Sodium sulfate: Xb mol/L
   Glucoheptonate: 0.6 mol/L
   Sulfamic acid: 1.0 mol/L
   Surfactant (polyoxyethylene alkylamine): 2 g/L (Composition of Tin Plating Bath Y)
   Tin(II) methanesulfonate: Ya mol/L
   Sodium sulfate: Yb mol/L
   Sodium gluconate: 0.80 mol/L
   Methanesulfonic acid: 0.5 mol/L
   Surfactant (aliphatic alkyl quaternary ammonium salt): 1 g/L (pH Adjustment)

Six plating baths having a pH of 5.0, 6.0, 6.1, 6.5, 10.5 or 10.6 were prepared by adding sodium hydroxide to the tin plating bath X containing Xa mol/L of tin(II) sulfamate and Xb mol/L of sodium sulfate.

In the same manner, seven plating baths having a pH of 5.0, 6.0, 6.1, 6.5, 7.5, 10.5 or 10.6 were prepared by adding sodium hydroxide to the tin plating bath Y containing Ya mol/L of tin(II) methanesulfonate and Yb mol/L of sodium sulfate.

Table 1 summarizes the concentrations Xa and Ya and pH of the tin plating baths.

TABLE 1

| Sample No. | Tin plating bath No. | pH of bath | [Xa or Ya] Sn$^{2+}$ ion concentration A (mol/L) | [Xb or Yb] sulfate ion concentration B (mol/L) | Molar ratio B/A |
|---|---|---|---|---|---|
| 1 | X | 5.0 | Xa = 0.10 | Xb = 0.01 | 0.1 |
| 2 | X | 6.0 | Xa = 0.10 | Xb = 0.01 | 0.1 |
| 3 | X | 6.1 | Xa = 0.10 | Xb = 0.01 | 0.1 |
| 4 | X | 6.5 | Xa = 0.10 | Xb = 0.01 | 0.1 |
| 5 | X | 10.5 | Xa = 0.10 | Xb = 0.01 | 0.1 |
| 6 | X | 6.5 | Xa = 0.03 | Xb = 0.01 | 0.33 |
| 7 | X | 6.5 | Xa = 0.51 | Xb = 0.01 | 0.02 |
| 8 | X | 6.5 | Xa = 0.10 | Xb = 0.005 | 0.05 |
| 9 | X | 6.5 | Xa = 0.32 | Xb = 0.31 | 0.97 |
| 10 | X | 6.5 | Xa = 0.10 | Xb = 0.09 | 0.9 |
| 11 | X | 10.6 | Xa = 0.10 | Xb = 0.01 | 0.1 |
| 12 | X | 6.1 | Xa = 0.10 | Xb = 0.10 | 1 |
| 13 | X | 6.5 | Xa = 0.10 | Xb = 0.10 | 1 |
| 14 | X | 10.5 | Xa = 0.10 | Xb = 0.10 | 1 |
| 15 | X | 6.5 | Xa = 0.02 | Xb = 0.01 | 0.5 |
| 16 | X | 6.5 | Xa = 0.52 | Xb = 0.01 | 0.02 |
| 17 | X | 6.5 | Xa = 0.10 | Xb = 0.003 | 0.03 |
| 18 | X | 6.5 | Xa = 0.10 | Xb = 0.32 | 3.2 |
| 19 | Y | 5.0 | Ya = 0.16 | Yb = 0.02 | 0.13 |
| 20 | Y | 6.0 | Ya = 0.16 | Yb = 0.02 | 0.13 |
| 21 | Y | 6.1 | Ya = 0.16 | Yb = 0.02 | 0.13 |
| 22 | Y | 6.5 | Ya = 0.16 | Yb = 0.02 | 0.13 |
| 23 | Y | 10.5 | Ya = 0.16 | Yb = 0.02 | 0.13 |
| 24 | Y | 6.5 | Ya = 0.03 | Yb = 0.02 | 0.67 |
| 25 | Y | 6.5 | Ya = 0.51 | Yb = 0.02 | 0.04 |
| 26 | Y | 6.5 | Ya = 0.16 | Yb = 0.005 | 0.03 |
| 27 | Y | 6.5 | Ya = 0.32 | Yb = 0.31 | 0.97 |

TABLE 1-continued

| Sample No. | Tin plating bath No. | pH of bath | [Xa or Ya] Sn$^{2+}$ ion concentration A (mol/L) | [Xb or Yb] sulfate ion concentration B (mol/L) | Molar ratio B/A |
|---|---|---|---|---|---|
| 28 | Y | 6.5 | Ya = 0.16 | Yb = 0.09 | 0.56 |
| 29 | Y | 10.6 | Ya = 0.16 | Yb = 0.02 | 0.13 |
| 30 | Y | 6.1 | Ya = 0.16 | Yb = 0.16 | 1 |
| 31 | Y | 7.5 | Ya = 0.16 | Yb = 0.16 | 1 |
| 32 | Y | 10.5 | Ya = 0.16 | Yb = 0.16 | 1 |
| 33 | Y | 6.5 | Ya = 0.02 | Yb = 0.02 | 1 |
| 34 | Y | 6.5 | Ya = 0.52 | Yb = 0.02 | 0.04 |
| 35 | Y | 6.5 | Ya = 0.16 | Yb = 0.003 | 0.02 |
| 36 | Y | 6.5 | Ya = 0.16 | Yb = 0.32 | 2 |

Tin films having an average thickness in the range of 2.5 to 3.0 μm were formed in the tin plating bath X or Y by barrel plating at an electric current density at the cathode of 0.05 (A/dm$^2$). Thus, multilayer ceramic capacitors 1-32 were prepared. (1) The average thickness of tin plating (μm) and (2) the coefficient of variation (CV) (%) of the thickness of tin plating were determined for twenty samples each of the multilayer ceramic capacitors 1-36 with a fluorescent X-ray coating thickness gauge. Table 2 shows the results.

Furthermore, (3) the solderability of the multilayer ceramic capacitors was evaluated as described below.

Evaluation of solderability: A multilayer ceramic capacitor was subjected to a pressure cooker test at a temperature of 105° C., a relative humidity of 100% and a pressure of 1.22× 10$^5$ Pa for four hours. The multilayer ceramic capacitor was then dipped in a Sn-3Ag-0.5Cu solder bath at 230° C. for two seconds. The surface coverage with solder was then determined. The surface coverage with solder of less than 95% was considered to be poor soldering.

Table 2 shows the results.

Furthermore, the multilayer ceramic capacitors were evaluated for (4) the elution of barium, (5) a high-temperature test, (6) a humidity test, and (7) the adhesiveness of plating, as described below.

(4) Elution of barium: The elution of barium ion from the multilayer ceramic capacitors was evaluated by measuring the amount of barium by inductively coupled plasma-atomic emission spectroscopy (ICP-AES).

An elution of 5 ppm or less of barium was considered to be "no elution."

(5) High-temperature test: A voltage twice the rated voltage was applied to the multilayer ceramic capacitors at a temperature of 85° C. for 2000 hours. The insulation resistance was then measured. An insulation resistance of 1 MΩ or less after the high-temperature test was considered to be a fault.

(6) Humidity test: The rated voltage was applied to the multilayer ceramic capacitors at a temperature of 70° C. and a relative humidity of 95% for 2000 hours. The insulation resistances before and after the application of a voltage were measured. An insulation resistance of 1 MΩ or less after the humidity test was considered to be a fault.

(7) Adhesiveness of plating: After the multilayer ceramic capacitors were removed from the plating bath, adhesion between the multilayer ceramic capacitors was checked. The number of multilayer ceramic capacitors adhering to each other was counted per 1000 multilayer ceramic capacitors.

Table 2 shows the results.

TABLE 2

| Sample No. | Thickness of tin plating (μm) | CV of film thickness (%) | Number of defectives in solderability (-) | Elution of barium | Number of defectives in high-temperature test (-) | Number of defectives in humidity test (-) | Number of capacitors adhering to each other (-) |
|---|---|---|---|---|---|---|---|
| 1 | 2.9 | 12 | 102/1000 | No elution | 0/100 | 0/100 | 0/1000 |
| 2 | 2.7 | 10 | 26/1000 | No elution | 0/100 | 0/100 | 0/1000 |
| 3 | 2.9 | 5.8 | 0/1000 | No elution | 0/100 | 0/100 | 0/1000 |
| 4 | 2.9 | 5.6 | 0/1000 | No elution | 0/100 | 0/100 | 0/1000 |
| 5 | 2.8 | 5.1 | 0/1000 | No elution | 0/100 | 0/100 | 0/1000 |
| 6 | 2.9 | 6.0 | 0/1000 | No elution | 0/100 | 0/100 | 0/1000 |
| 7 | 2.9 | 8.1 | 0/1000 | No elution | 0/100 | 0/100 | 0/1000 |
| 8 | 2.8 | 5.9 | 0/1000 | No elution | 0/100 | 0/100 | 0/1000 |
| 9 | 2.9 | 7.7 | 0/1000 | No elution | 0/100 | 0/100 | 0/1000 |
| 10 | 3.1 | 5.2 | 0/1000 | No elution | 0/100 | 0/100 | 0/1000 |
| 11 | Not available because of cloudiness immediately after the initiation of plating. | | | | | | |
| 12 | 3.0 | 8.3 | 0/1000 | No elution | 0/100 | 0/100 | 25/1000 |
| 13 | 2.9 | 6.6 | 0/1000 | No elution | 0/100 | 0/100 | 51/1000 |
| 14 | 2.9 | 6.2 | 0/1000 | No elution | 0/100 | 0/100 | 60/1000 |
| 15 | 2.8 | 6.7 | 0/1000 | No elution | 0/100 | 0/100 | 112/1000 |
| 16 | 2.8 | 9.9 | 5/1000 | No elution | 0/100 | 0/100 | 0/1000 |
| 17 | 2.9 | 5.7 | 0/1000 | 100 ppm | 5/100 | 5/100 | 0/1000 |
| 18 | 2.8 | 5.1 | 0/1000 | No elution | 0/100 | 0/100 | 77/1000 |
| 19 | 2.8 | 11 | 220/1000 | No elution | 0/100 | 0/100 | 0/1000 |
| 20 | 2.9 | 9.5 | 31/1000 | No elution | 0/100 | 0/100 | 0/1000 |
| 21 | 2.7 | 6.0 | 0/1000 | No elution | 0/100 | 0/100 | 0/1000 |
| 22 | 2.8 | 5.3 | 0/1000 | No elution | 0/100 | 0/100 | 0/1000 |
| 23 | 2.8 | 4.9 | 0/1000 | No elution | 0/100 | 0/100 | 0/1000 |
| 24 | 3.0 | 5.3 | 0/1000 | No elution | 0/100 | 0/100 | 0/1000 |
| 25 | 2.7 | 8.9 | 0/1000 | No elution | 0/100 | 0/100 | 0/1000 |
| 26 | 2.7 | 5.5 | 0/1000 | No elution | 0/100 | 0/100 | 0/1000 |
| 27 | 2.9 | 7.5 | 0/1000 | No elution | 0/100 | 0/100 | 0/1000 |
| 28 | 2.8 | 5.6 | 0/1000 | No elution | 0/100 | 0/100 | 0/1000 |
| 29 | Not available because of cloudiness immediately after the initiation of plating. | | | | | | |
| 30 | 2.8 | 9.1 | 0/1000 | No elution | 0/100 | 0/100 | 15/1000 |
| 31 | 2.9 | 8.0 | 0/1000 | No elution | 0/100 | 0/100 | 23/1000 |

TABLE 2-continued

| Sample No. | Thickness of tin plating (μm) | CV of film thickness (%) | Number of defectives in solderability (-) | Elution of barium | Number of defectives in high-temperature test (-) | Number of defectives in humidity test (-) | Number of capacitors adhering to each other (-) |
|---|---|---|---|---|---|---|---|
| 32 | 2.7 | 5.8 | 0/1000 | No elution | 0/100 | 0/100 | 24/1000 |
| 33 | 2.8 | 6.7 | 0/1000 | No elution | 0/100 | 0/100 | 53/1000 |
| 34 | 3.0 | 9.6 | 4/1000 | No elution | 0/100 | 0/100 | 0/1000 |
| 35 | 2.8 | 5.4 | 0/1000 | 100 ppm | 5/100 | 4/100 | 0/1000 |
| 36 | 2.9 | 5.9 | 0/1000 | No elution | 0/100 | 0/100 | 51/1000 |

Tables 1 and 2 show that multilayer ceramic capacitors 1, 2, 19 and 20, in which the pH of the tin plating bath was 6.0 or less, exhibited poor soldering.

Further examination showed that the poor soldering with the plating bath having a pH of 5.0 was caused by a small thickness of tin plating of 1.5 μm or less or by an insufficient quality of the tin film.

On the other hand, observation with a scanning electron microscope (SEM) showed that the poor soldering with the plating bath having a pH of 6.0 was caused only by an insufficient quality of the tin film. Tables 1 and 2 show that the plating bath having a pH of at least 6.1 can prevent poor soldering.

Furthermore, variations in the thickness of tin plating can also be reduced at a pH of at least 6.1.

In multilayer ceramic capacitors 11 and 29, in which the plating bath had a pH as high as 10.6, the plating bath became white turbid immediately after the initiation of plating. Because it was difficult to plate the multilayer ceramic capacitors, the evaluation was suspended. Hence, the pH of the plating bath should be 10.5 or less.

Furthermore, as is clear from multilayer ceramic capacitors 15 and 33, ceramic capacitors sometimes adhered to each other at a tin ion concentration of 0.03 mol/L or less. As is clear from multilayer ceramic capacitors 16 and 34, a tin ion concentration of 0.51 mol/L or more sometimes resulted in an increase in the CV of film thickness and poor soldering.

As is clear from multilayer ceramic capacitors 18 and 36, when the molar ratio B/A of the sulfate ion concentration B to the tin ion concentration A is one or more, the ceramic capacitors sometimes adhered to each other. By contrast, the adhesion did not occur at a molar ratio B/A of less than one. Hence, the molar ratio B/A must be less than one.

As is clear from multilayer ceramic capacitors 17 and 35, barium was eluted from the ceramic capacitors at a sulfate ion concentration B of less than 0.005 mol/L. Thus, the elution of barium can effectively be reduced at a sulfate ion concentration of 0.005 mol/L or more.

Furthermore, as is clear from multilayer ceramic capacitors 18 and 36, the ceramic capacitors sometimes adhered to each other at a sulfate ion concentration B of more than 0.31 mol/L. Hence, the sulfate ion concentration B must be in the range of 0.005 to 0.31 mol/L.

The invention claimed is:

1. A method for manufacturing a ceramic electronic component, comprising the steps of:
   providing a barium-containing ceramic electronic component; and
   forming an electrode on the outer surface of the electronic component, the electrode being electroplated with tin, wherein a plating bath used in the tin plating has a tin ion concentration A in the range of 0.03 to 0.51 mol/L, a sulfate ion concentration B in the range of 0.005 to 0.31 mol/L, the molar ratio B/A being less than one, and a pH in the range of 6.1 to 10.5.

2. A plating bath having a tin ion concentration A in the range of 0.03 to 0.51 mol/L, a sulfate ion concentration B in the range of 0.005 to 0.31 mol/L, the molar ratio B/A being less than one, and a pH in the range of 6.1 to 10.5.

3. A plating bath according to claim 2, wherein the tin ion concentration A is 0.1 to 0.32 mol/L, the sulfate ion concentration B is 0.01 to 0.16 mol/L, the molar ratio B/A is 0.97 or less, and the pH is in the range of 6.5 to 7.5.

4. A plating bath according to claim 3, further comprising a complexing agent in a molar ratio of complexing agent to tin ions of at least 1.5.

5. A plating bath according to claim 2, further comprising a complexing agent in a molar ratio of complexing agent to tin ions of at least 1.5.

6. A method for manufacturing a ceramic electronic component according to claim 1, wherein the tin ion concentration A is 0.1 to 0.32 mol/L, the sulfate ion concentration B is 0.01 to 0.16 mol/L, the molar ratio B/A is 0.97 or less, and the pH is in the range of 6.5 to 7.5.

7. A method for manufacturing a ceramic electronic component according to claim 6, further comprising forming said plating bath.

8. A method for manufacturing a ceramic electronic component according to claim 1, further comprising forming said plating bath.

9. A method for manufacturing a ceramic electronic component according to claim 1, wherein the electrode with tin plating comprises a copper layer on the outer surface on the electronic component, a nickel layer on the copper layer and the tin plating on the copper layer.

10. A method for manufacturing a ceramic electronic component according to claim 9, wherein more than one said electrode is formed on the outer surface of the electronic component.

11. A method for manufacturing a ceramic electronic component according to claim 10, wherein the tin ion concentration A is 0.1 to 0.32 mol/L, the sulfate ion concentration B is 0.01 to 0.16 mol/L, the molar ratio B/A is 0.97 or less, and the pH is in the range of 6.5 to 7.5.

12. A method for manufacturing a ceramic electronic component according to claim 1, wherein the molar ratio B/A is 0.97 or less.

13. A method for manufacturing a ceramic electronic component according to claim 1, wherein the molar ratio B/A is 0.67 or less.

14. A plating bath according to claim 2, wherein the molar ratio B/A is 0.97 or less.

15. A plating bath according to claim 2, wherein the molar ratio B/A is 0.67 or less.

* * * * *